Dec. 10, 1929.   H. S. CHAPIN   1,739,386
VEHICLE SPRING
Filed April 1, 1926   2 Sheets-Sheet 1
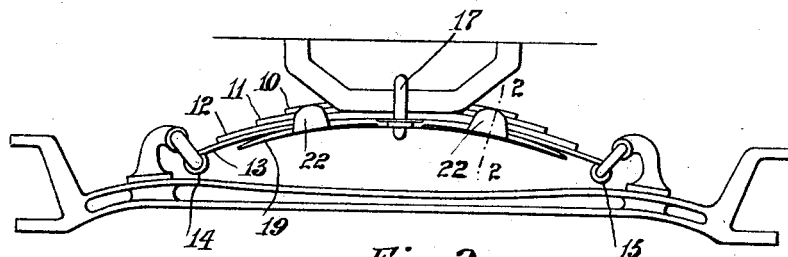
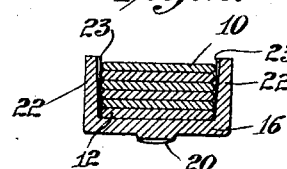
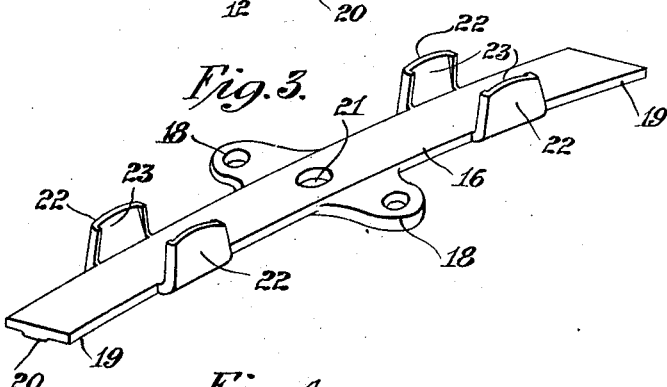
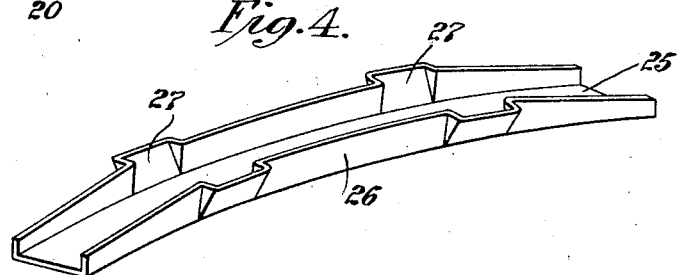
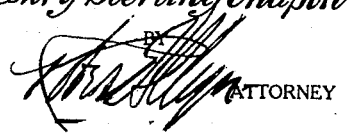

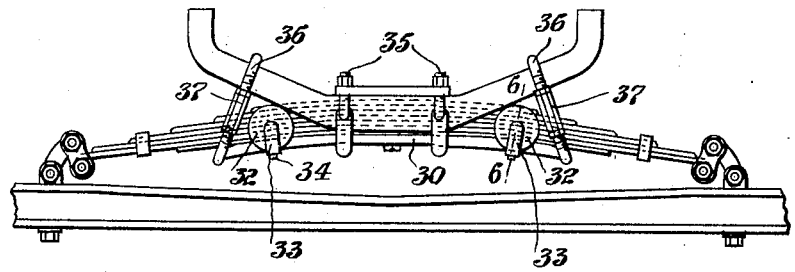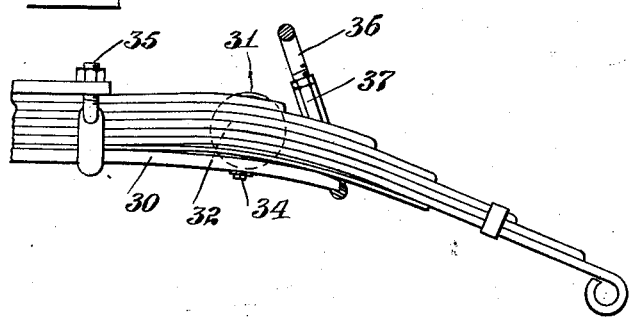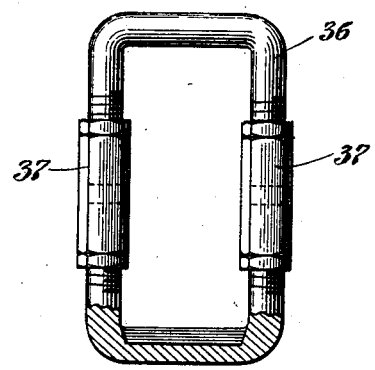

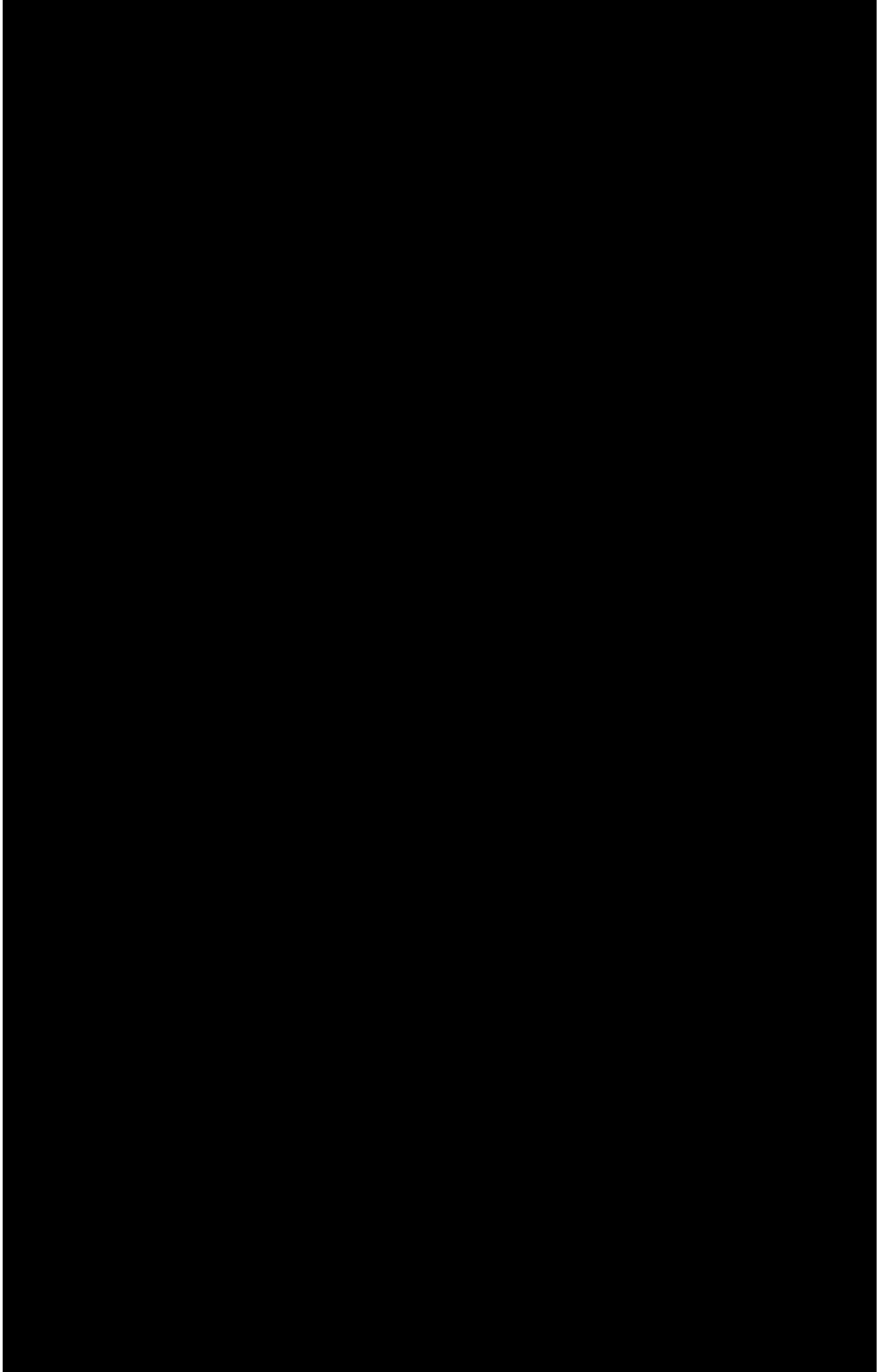

Dec. 10, 1929.    H. S. CHAPIN    1,739,386
VEHICLE SPRING
Filed April 1, 1926    2 Sheets-Sheet 1
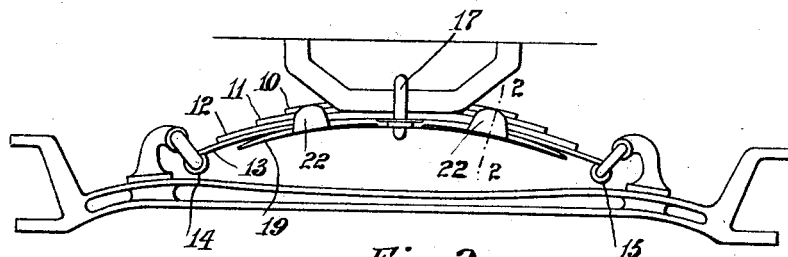
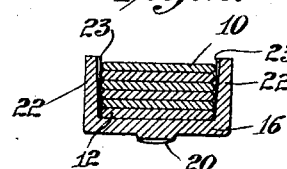
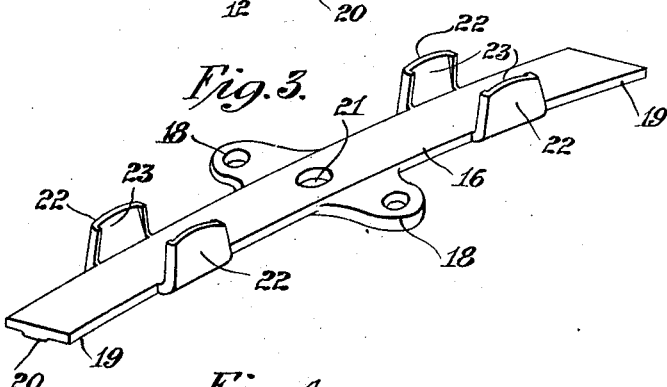
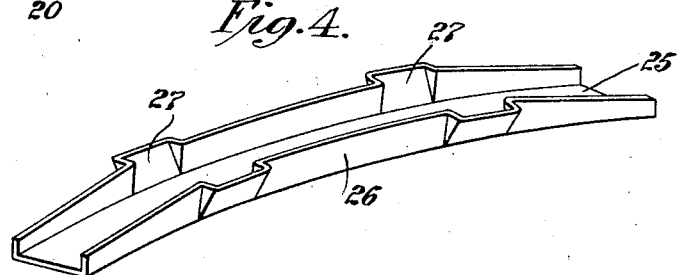
INVENTOR
Henry Sterling Chapin
BY
ATTORNEY